United States Patent

Oliver et al.

(10) Patent No.: US 8,170,020 B2
(45) Date of Patent: May 1, 2012

(54) LEVERAGING ACTIVE FIREWALLS FOR NETWORK INTRUSION DETECTION AND RETARDATION OF ATTACK

(75) Inventors: Robert Ian Oliver, Issaquah, WA (US); Alexander Frank, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 575 days.

(21) Appl. No.: 11/298,411

(22) Filed: Dec. 8, 2005

(65) Prior Publication Data

US 2007/0133537 A1 Jun. 14, 2007

(51) Int. Cl.
*H04L 12/28* (2006.01)
*G06F 7/04* (2006.01)

(52) U.S. Cl. .......................................... 370/392; 726/23

(58) Field of Classification Search ................... 370/392; 726/23
See application file for complete search history.

(56) References Cited

U.S. PATENT DOCUMENTS

| | | | |
|---|---|---|---|
| 6,141,749 A | 10/2000 | Coss et al. | |
| H1944 H | 2/2001 | Cheswick et al. | |
| 6,324,656 B1 | 11/2001 | Gleichauf et al. | |
| 6,405,318 B1 * | 6/2002 | Rowland | 726/22 |
| 6,550,012 B1 | 4/2003 | Villa et al. | |
| 6,651,174 B1 | 11/2003 | Nagaoka et al. | |
| 6,957,348 B1 | 10/2005 | Flowers et al. | |
| 7,072,820 B1 * | 7/2006 | Bailey et al. | 703/17 |
| 7,506,360 B1 * | 3/2009 | Wilkinson et al. | 726/3 |
| 2002/0083175 A1 * | 6/2002 | Afek et al. | 709/225 |
| 2002/0188864 A1 | 12/2002 | Jackson | |
| 2003/0023876 A1 | 1/2003 | Bardsley et al. | |
| 2003/0070003 A1 * | 4/2003 | Chong et al. | 709/330 |
| 2003/0167406 A1 * | 9/2003 | Beavers | 713/201 |
| 2005/0005031 A1 | 1/2005 | Gordy et al. | |
| 2005/0018618 A1 * | 1/2005 | Mualem et al. | 370/252 |
| 2005/0076237 A1 * | 4/2005 | Cohen et al. | 713/201 |
| 2005/0229246 A1 | 10/2005 | Rajagopal et al. | |
| 2005/0257084 A1 * | 11/2005 | Fairhurst et al. | 714/7 |
| 2006/0067324 A1 * | 3/2006 | Kim et al. | 370/395.2 |
| 2006/0179485 A1 * | 8/2006 | Longsine et al. | 726/23 |

FOREIGN PATENT DOCUMENTS

| | | | |
|---|---|---|---|
| KR | WO 2005/064842 | * | 7/2005 |
| WO | WO 2005/099214 | | 10/2005 |

OTHER PUBLICATIONS

Hess, et al., "Combining Multiple Intrusion Detection and Response Technologies in an Active Networking Based Architecture," http://www.tkn.tu-berlin.de/~schaefer/Publications/dfn03.pdf, 10 pages.

(Continued)

*Primary Examiner* — John Blanton (57) ABSTRACT

A computer network firewall or network filter functions normally to pass data on open ports to a respective service or data source associated with an open port. In addition, traffic arriving on closed ports may be directed to a handler for analysis and response. The handler may analyze and catalog the source and type of traffic arriving on the closed ports. The handler may then send a response with either a fixed response or data tailored to the type and nature of the traffic. The handler may respond slowly to cause the source of the traffic to wait for the response, thereby slowing the speed at which a potential attacker can identify valid targets and proceed past non-valid targets.

12 Claims, 6 Drawing Sheets

OTHER PUBLICATIONS

Jung, et al., "Fast Portscan Detection Using Sequential Hypothesis Testing," http:/www.cs.unc.edu/~jeffay/courses/nidsS05/ai/Paxson-Portscan-oak04.pdf, 15 pages.

Staniford, et al., "Practical Automated Detection of Stealthy Portscans," http://iospress.metapress.com/(eiiznfyp0if4sr45homfi)/app/home/contribution.asp , printed Nov. 9, 2005 (3 pages).

* cited by examiner

LEVERAGING ACTIVE FIREWALLS FOR NETWORK INTRUSION DETECTION AND RETARDATION OF ATTACK

BACKGROUND

Networked computers represent significant targets of opportunity for both recreational and malicious hackers, viruses, worms, scripted attacks, etc. Hacks and hackers are called different things and have different levels of sophistication, but in almost all cases successful hacks gain access to a computer through its network interface. This is particularly true when the network interface is coupled to the Internet. Computers supporting Internet Protocol (IP) and other IP network nodes, are identified by their IP address. Each network interface may support up to several thousand ports. To help manage security of the network interface, a firewall may be employed which processes data arriving for individual ports. Some ports such as port 80, commonly used for HTTP protocol support, may be assigned or opened to allow traffic to pass through to a corresponding service, for example, running on a web server, that manages HTTP traffic. The firewall may close all other ports to restrict outside traffic from gaining access to the network.

In closing all other ports, the firewall may give information to a potential hacker about which ports are closed relatively quickly, thereby allowing them to focus attacks on the open ports.

SUMMARY

A firewall or network filter may be configured to pass data on open ports in a conventional manner. However, traffic appearing on closed ports (those that are not configured for expected data traffic) may be routed to a handler for logging, analyzing, and/or responding to such traffic. When responding to traffic on closed ports, the handler may send data that will require analysis or some kind of attention on the part of the hacker's system, or the hacker personally. The data sent may be a fixed response, or may use some heuristics to provide a more targeted response. Additionally, the handler may send information about traffic on the closed ports, that is, data about a potential attack, to neighboring machines and/or a clearinghouse for widespread distribution of data regarding the potential attack. The handler may also receive information from a neighboring machine and/or a clearinghouse in order to better deal with potential hacks, viruses, worms, etc.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
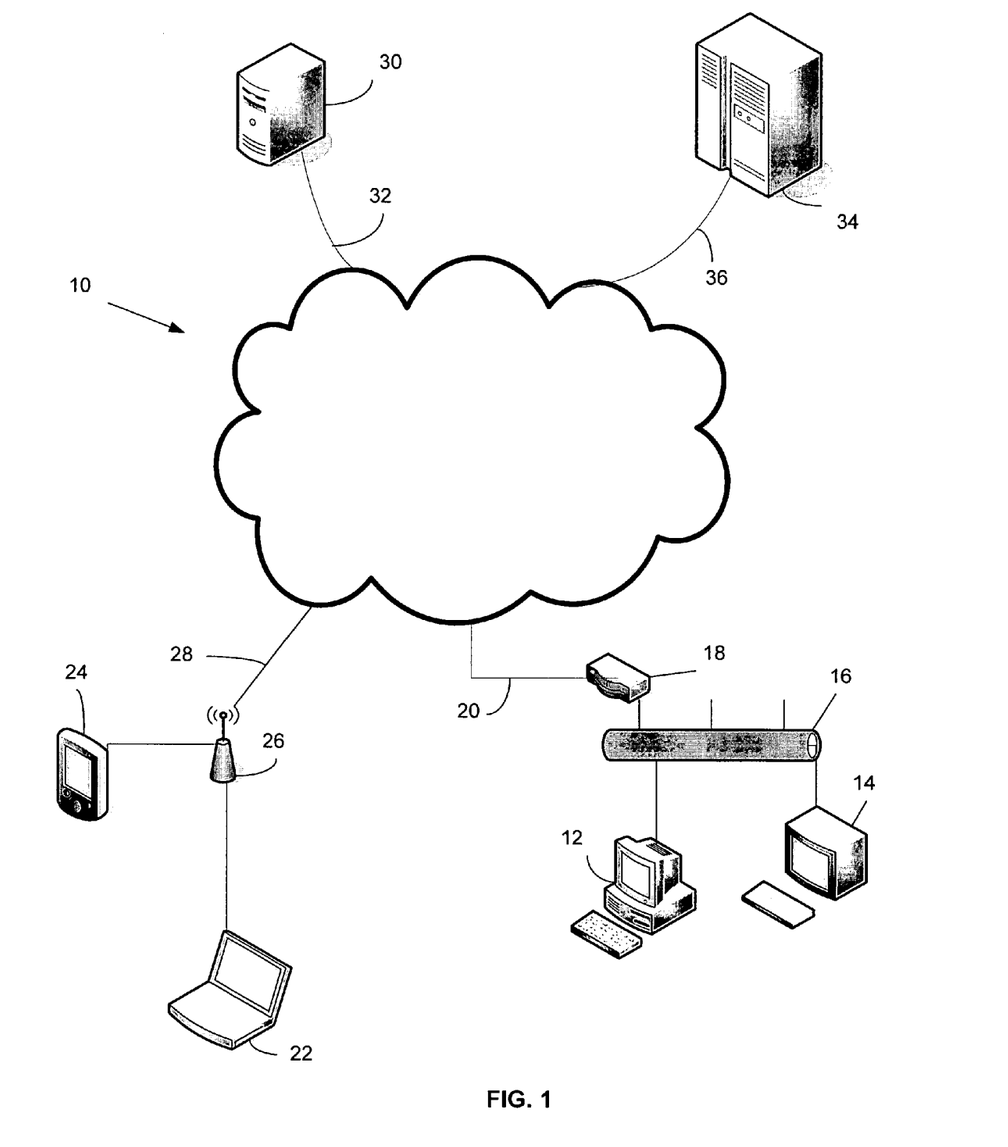
FIG. 1 is a simplified and representative block diagram of a computer network.

FIG. 1 illustrates a network 10 that may be used to implement a pay-per-use computer system. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20 using a modem (not depicted). On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36.

Figure 2:
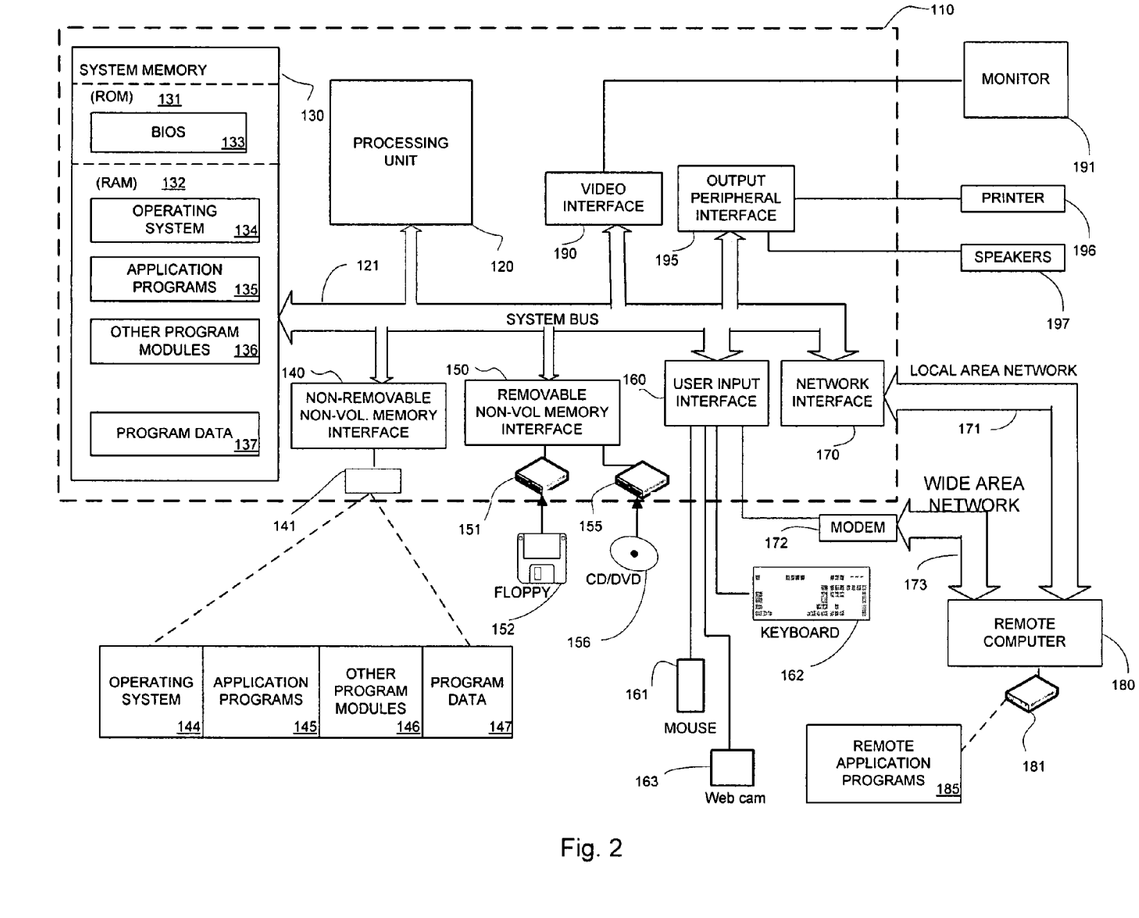
FIG. 2 is a block diagram of a computer that may be connected to the network of FIG. 1.

FIG. 2 illustrates a computing device in the form of a computer 110 that may be connected to the network 10. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Another input device may be a camera for sending images over the Internet, known as a web cam 163. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
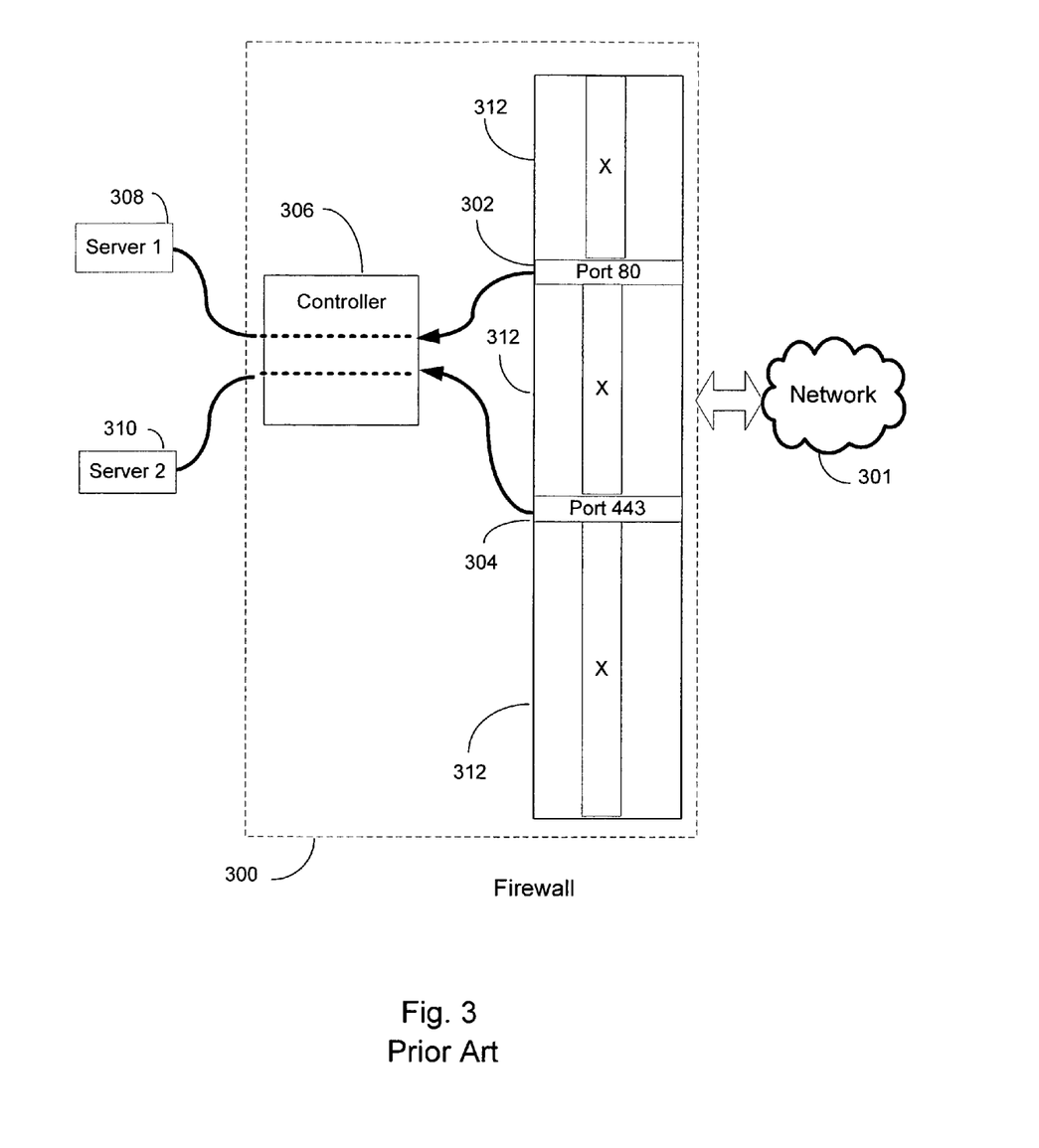
FIG. 3 is a simplified and representative block diagram of a prior art firewall.

FIG. 3 is a simplified logical block diagram of a prior art firewall. The physical connections and data routing may differ depending on implementation. The prior art firewall 300 may be coupled to a network 301, such as the Internet. The firewall 300 may have a series of ports for receiving network traffic. Certain ports may be opened, or assigned, such as port 80 302 and port 443 304 that are typically used for http and https traffic respectively. A controller 306 may be used to configure the open or assigned ports and pass them through to associated data sources, for example, server 1 308 and server 2 310. The closed or unassigned ports 312 block traffic from coming in from the network 301. In more sophisticated applications, the closed or unassigned ports 312 may block traffic in both directions. When exploring for vulnerabilities, a hacker or other non-authorized user may perform a port scan looking for potential targets of opportunity for an attack. In the prior art firewall 300, closed ports are immediately detectable. Thus, a port scan may proceed rapidly through the unassigned ports to find open ports and, in essence, reduce the effort required by a hacker to probe for a vulnerability.

Figure 4:
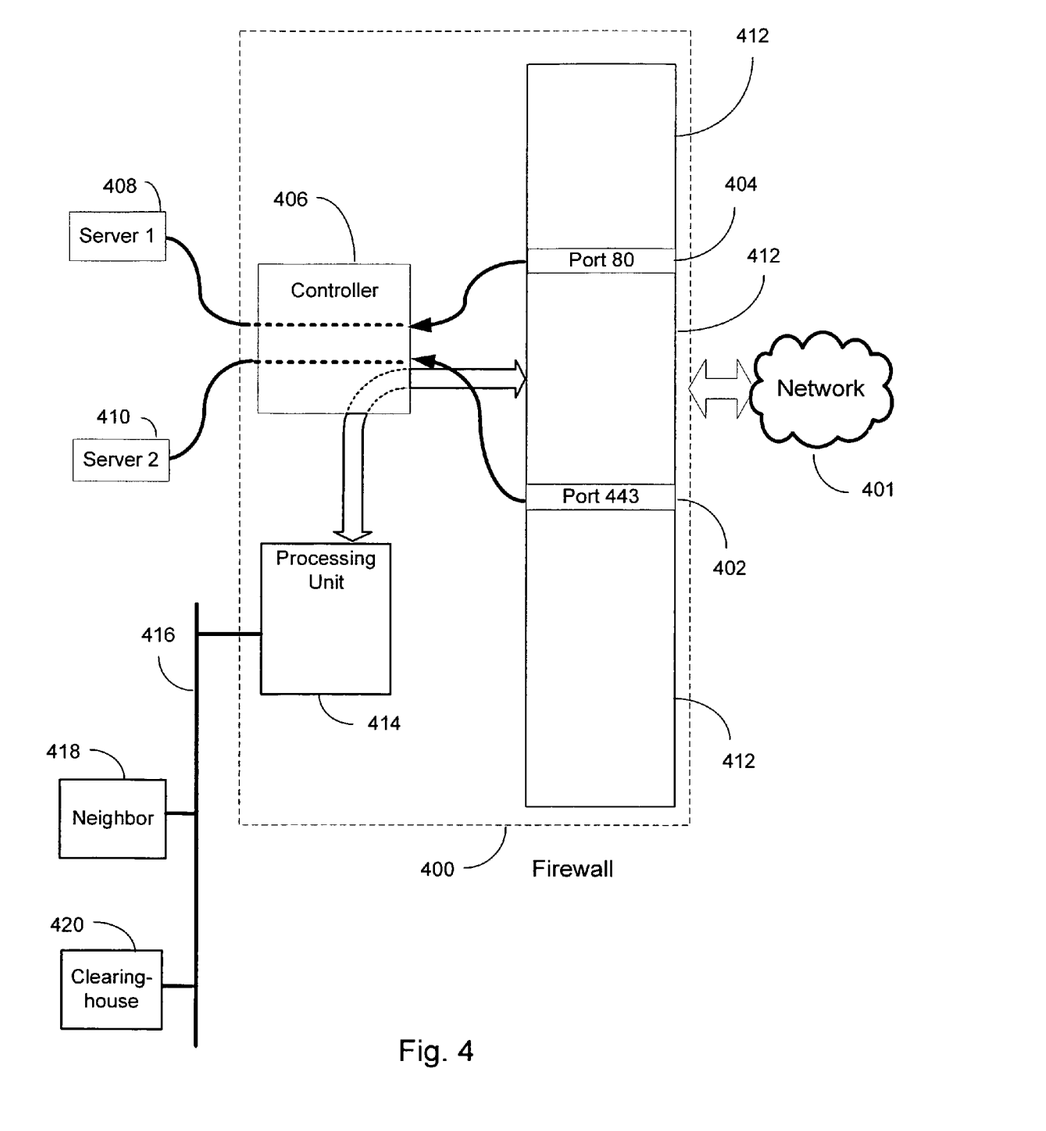
FIG. 4 is a simplified and representative block diagram of a firewall.

FIG. 4 is a simplified and representative block diagram of a firewall 400. The firewall 400 may be associated with devices on a network, such as network 10 of FIG. 1. For example, the firewall may be installed in front of server 30 or mainframe 34. In such installations, the firewall 400 may be a separate unit with standalone functionality. However, other embodiments are likely. For example, a desktop computer 12 or laptop computer 22 may incorporate a firewall. Similar to the prior art firewall 300, the firewall 400 may be connected to a network 401, such as the Internet. The firewall 400 may support one or more open ports, such as port 443 402 or port 80 404. A controller 406 may be used to designate open and closed ports and to route traffic from open ports to servers/services or other data sources corresponding to the designated ports, such as server 1 408 and server 2 410. In the case of a local software firewall, the roles of servers 408 and 410 may be represented by individual software processes also resident on the same machine. However, traffic on closed ports 412 may be routed to a processing unit 414 for analysis and disposition. The processing unit 414 may analyze traffic received on the closed ports 412 and take one or more designated actions, described below. Although one embodiment describes a firewall implementation, in an alternative embodiment, the ports may be supported on a simple network filter. The functions described are identical in either embodiment.

First, the processing unit 414 may determine if the traffic represents a known attack profile. Simply determining that an attack may be in progress may allow the processing unit 414 to take steps to mitigate such an attack by modifying the firewall operational profile 400, or alerting a network management function of the potential attack to allow modifying server 1 408 or server 2 410 profiles, among other potential actions.

Second, the processing unit 414, or a related network management function, may notify, over network interface 416, a neighboring computing node 418, or entity, regarding the nature of the traffic received on closed ports 412. Similarly, the processing unit 414 may notify a clearinghouse 420 of a potential attack and any collected attack profile data. The clearinghouse 420 may forward data regarding the potential attack to other clearinghouses or directly to other computers or network assets. The clearinghouse 420 may independently verify attack data and attack profile information. A hierarchy of clearinghouses (not depicted) may exist representing an increasing level of trustworthiness with respect to attack data. For example, a clearinghouse associated with a widely known source of trust and data, such as Microsoft or VeriSign, may act as a central clearinghouse. The network 416 may be the same as the network 401, but is shown separately in this logical diagram to indicate that special handling may be used, for example, a secure session (SSL) or a secure tunnel may be used to help prevent spoofing or tampering of clearinghouse data.

Data regarding the nature of the traffic received on closed ports 412 may include routing information, source information, payload data, or other identifying characteristics that may be useful in identifying and preempting similar traffic received at other locations and/or at other times. The traffic may be categorized as being benign if it is a simple ping from a known source, such as a computer from the same sub-net. The traffic may be categorized as a threat when it comes from an unknown external source or if the traffic payload contains known data meeting a threat profile. The threat profile may include data patterns corresponding to attacks targeting previously-recognized vulnerabilities in a system, such as an un-patched operating system.

Third, the processing unit 414 may develop a response to the traffic received on any closed ports. The response may vary from random data to a highly specific, targeted response, both intended to delay or confuse a potential attacker, perhaps significantly. A random data response may contain fixed data or selections from a list of fixed responses. Alternatively, a targeted response may be generated using information from the received traffic in conjunction with any information on file about known attacks. The targeted response may lead an attacker to believe the particular vulnerability being probed exists and would be a target of opportunity. It may take several rounds of data passing for the attacker, particularly when using an automated attack or script, to realize the port is not valid. When multiplied by each closed port, and combined with slow responses (see next), the velocity of an attack may be significantly altered, allowing network managers to identify and respond to the potential threat.

UDP\IP traffic, that is normally not acknowledged, may be accepted silently, that is, without any response that would indicate a closed port had been encountered.

In one embodiment, the processing unit 414 may manipulate the response times to delay the attacking endpoint resulting in considerably slowing the attacking party and forcing it to allocate resources as long as it attempts attacking the active firewall. Multiplying this against numerous active firewalls (e.g. many hosts) would serve to exhaust the resources of potential attackers. For example, the processing unit may delay the response 75% or more of the maximum supported response time. If a typical TCP/IP stack is willing to wait up to 30 seconds for a response, then 75% results in 22.5 seconds delay. The delay between packets may vary along time—making it harder for the attacker to recognize the protection mechanism. By sending data, the processing unit 414 causes the attacker to analyze each response to determine whether valid or useful data may be available at that port, and further, makes the attacker wait for the scan of each port for nearly the maximum possible time.

Another mechanism is to reduce the size of the data packets to a minimal size which the attacker is willing to accept. It is a networking phenomenon that both endpoints negotiate the size of the packets that they exchange. That is, there is no way an endpoint can force a larger size than the other counterpart is willing to accept. This allows the active firewall to reduce the effective bandwidth used between the attacker and the active firewall. Having the active firewall specify a packet size with zero payload would reduce the effective bandwidth to zero (even so both sides converse over the network). It is quite challenging for an attacker to identify this situation because this would force it to have a network stack that would dynamically analyze the communication—well beyond the scope of typical attacking software, particularly malware, which would become more cumbersome and easier to detect the larger it is. Here as well, as a result of smaller payloads, the attack would take longer forcing the attacker to allocate resources for more time per target.

Yet another mechanism is to purposely inflate the error rate. That is, the active firewall would lie about the error rates in the received payloads. This would force the attacker to resend packets. Again, this measure may be used inconsistently to make it harder for an attacker analyze the situation and realize that this is done on purpose.

These three simple measures can significantly reduce an attacker's effectiveness in launching an attack or propagating a worm or virus.

The firewall 400 described should not be mistaken for a honeypot. A honeypot is a form of research tool on attacks. The following quote from SearchSecurity.com™ describes a honeypot:

> A honey pot is a computer system on the Internet that is expressly set up to attract and "trap" people who attempt to penetrate other people's computer systems. (This includes the hacker, cracker, and script kiddy.) To set up a honey pot, it is recommended that you:
> Install the operating system without patches installed and using typical defaults and options
> Make sure that there is no data on the system that cannot safely be destroyed
> Add the application that is designed to record the activities of the invader
> Maintaining a honey pot is said to require a considerable amount of attention and may offer as its highest value nothing more than a learning experience (that is, you may not catch any hackers).

From this description it is easy to distinguish the firewall 400 from a honeypot. The honeypot is a computer system laid open to attack for the sole purpose of attracting would-be hackers. It may not even use a firewall. The honeypot attempts to appear in every respect like a prime target. Conversely, the firewall 400 may be part of a live system passing genuine traffic but provides additional capabilities to address attempted access for disruptive or malicious purposes. The firewall 400 attempts to glean information about a hack or other attack, such as a denial of service (DOS) attack while at the same time slowing the attack by tying up the hackers resources with misleading and/or slow responses.

Figure 5:
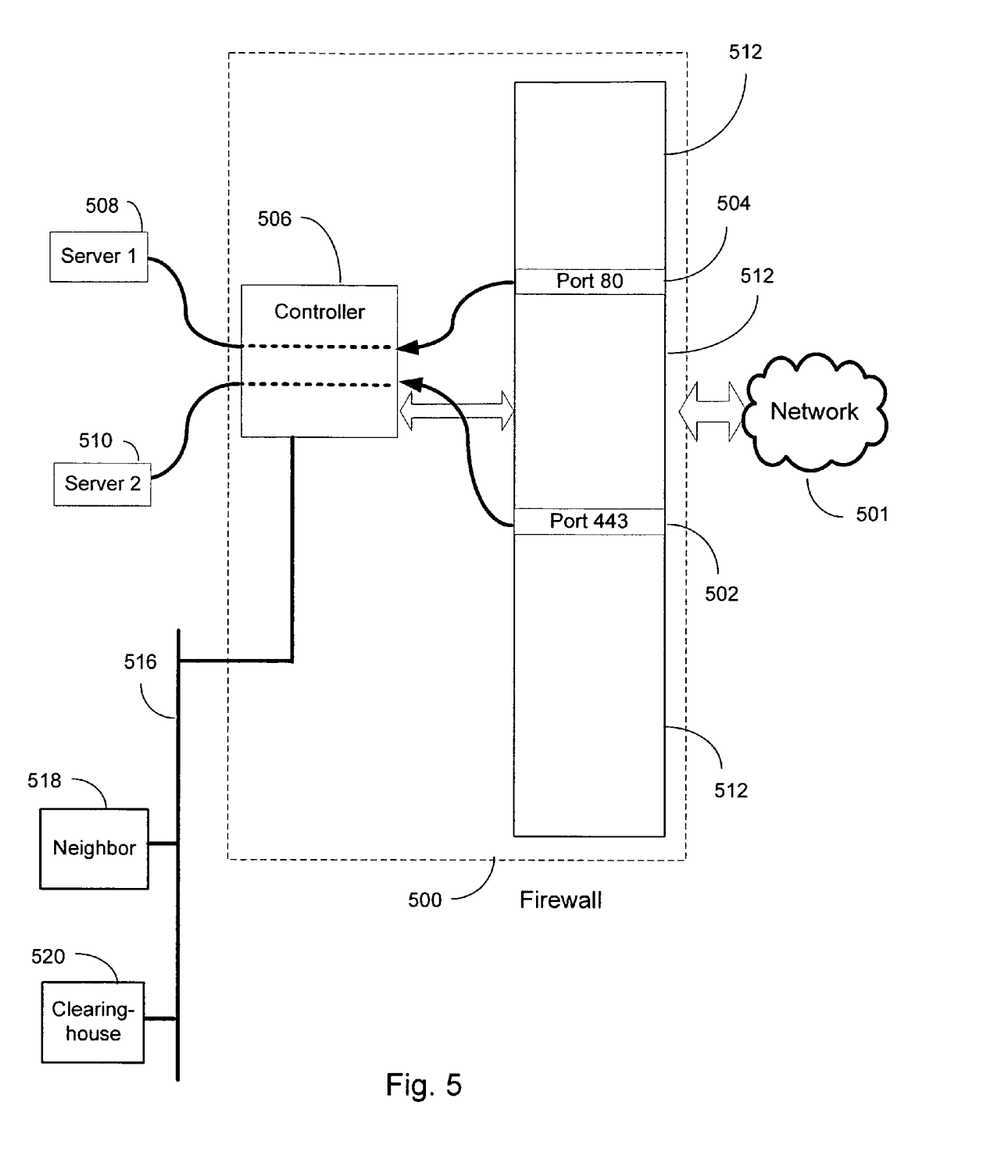
FIG. 5 is a simplified and representative block diagram of another embodiment of a firewall.

FIG. 5 shows an alternate embodiment of a firewall 500, similar to firewall 400 of FIG. 4. The firewall 500 has a network connection 501 and one or more active ports, for example ports 502 504. A controller 506 passes data from open ports to their respective services or servers, for example server 1 508 and server 2 510, as above. The controller 506 may also support configuration utilities for setting port status and part of the configuration utilities may also support a user interface (not depicted). In this exemplary embodiment, the controller 506 includes the functions of the processing unit 414 of FIG. 4. Data from closed ports 512 may be processed by the controller 506, and as discussed above, may provide responses to inquiries received on closed ports 512, as well as communicate with corresponding nodes such as neighbor 518 and clearinghouse 520 over network connection 516.

Figure 6:
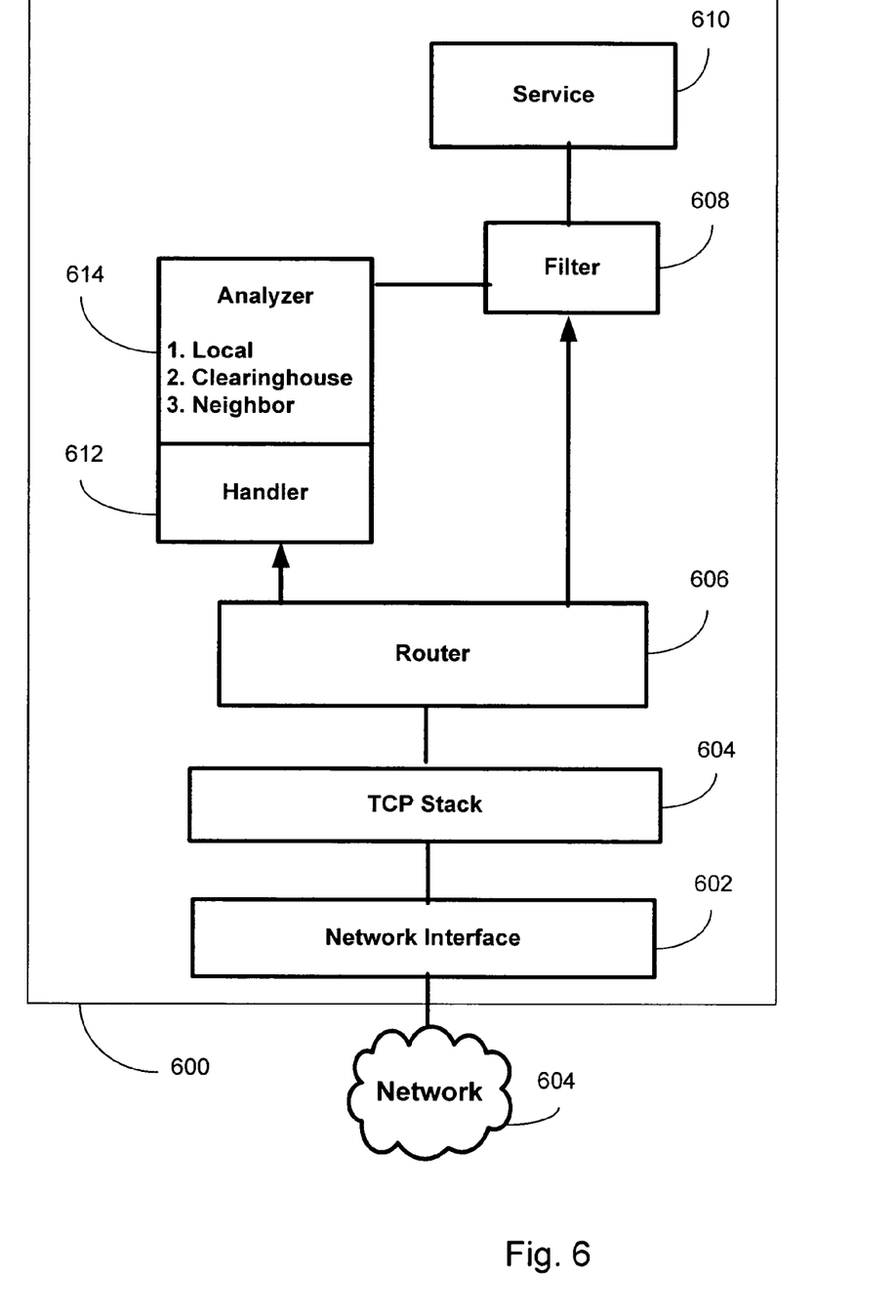
FIG. 6 is a block diagram of a firewall showing relationships among functional elements.

FIG. 6 is block diagram of a firewall 600 showing the relationship among functional elements. The firewall 600 includes a network interface 602 for coupling to a network 601. In some cases, the network may be the Internet but other networks such as Intranet's, LAN's and WAN's may be supported as well. Also, the exemplary embodiment described is based on Internet Protocol (which includes TCP/IP, UDP/IP, and other derivatives), but it applies to other protocols as well, e.g. IPX/SPX.

The network interface 602 may pass data traffic to a TCP/IP stack, when the protocol is TCP, which in turn passes the data traffic to an internal router 606. The router does not necessarily route based on destination address, since the destination may have already been reached, however the router 606 may direct traffic based on the port of the network interface at which the data traffic arrived. For example, traffic arriving on an open port, such as 80 may be directed to a service 610. An optional filter 608 may process the data traffic before it reaches the service 610.

Traffic arriving at closed ports, as discussed above, that is, ports not associated with a current service, may be directed to a handler 612. The handler may include an analyzer 614 for determining the nature of data traffic received through a closed port. The results of the analysis may be used by the filter 608 to watch for and block traffic on open ports that may have already appeared on a closed port. The analyzer 614 may also be a repository for information about suspected attacks received from other sources. As shown in the diagram, the highest priority, or highest trust level associated with suspected attacks may be the data generated internally. Internally generated information has virtually no issues with respect to reliability, age (that is, obsolescence), accuracy, or dependability of the source. Next in rank may be data received from a trusted and verifiable source, such as a clearinghouse. Last in rank may be data received from a neighbor or other largely uncorroborated source.

The ability for a firewall to delay and provide a response to a port scan rather than simply bounce back data may significantly delay and confuse a potential hacker or automated attack. Moving such functionality to the firewall may significantly improve the ability to identify and take steps to limit potential attacks. Sharing information from this first encounter may also allow other similar devices to quickly propagate attack information and further limit the success of would-be attacks.

The active firewall may have a threshold barrier that designates how many times a potentially attacking endpoint may "miss" (i.e. hit a port that is not attached to any service) before protection measures are used. The threshold may be different when a warning is received from the clearing-house or a neighbor reflecting the varying levels of trust on these sources.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A standalone network filter coupled to a computer system, the filter comprising:
   a network interface supporting a plurality of ports;
   a controller operable to route traffic originating from a sender that is received at an inactive port of the plurality of ports; and
   a processing unit operable to:
   receive the traffic routed from the controller;

obtain, from the traffic, traffic data including routing information for the traffic, source information about the sender, and payload information of the traffic;

based at least in part on the traffic data obtained from the traffic, categorize the traffic on the inactive port as a threat;

categorize the traffic on the inactive port as having a predetermined attack profile;

determine that the traffic meets a threshold number of communication attempts by the sender at the inactive port;

responsive to determining that the traffic meets a threshold number of communication attempts at the inactive port, perform protective measures comprising:

using the traffic data obtained from the traffic to provide a delayed response with an inflated error rate on the inactive port, wherein the delayed response communicates to the sender that a vulnerability exists on the computer system and causes the sender to allocate additional resources to continue attacking the computer system via the inactive port;

manipulating a payload size of the traffic from the sender on the inactive port to reduce communication bandwidth; and notifying a neighboring server and a clearinghouse of at least a portion of the traffic data obtained from the traffic.

2. The filter of claim 1, wherein to categorize the traffic on the inactive port as a threat is further based on suspected attack information.

3. The filter of claim 2, further comprising determining a trustworthiness ranking of the suspected attack information based on whether the suspected attack information is internally generated by the computer system, received from the neighboring server or another neighboring server, or the clearinghouse or another clearinghouse.

4. A standalone network firewall associated with a computer system, the firewall comprising:

a network interface supporting a plurality of ports associated with one or more services, including a closed port that is inactive and not associated with the one or more services;

a controller;

a processing unit separate from the controller or the one or more services, the controller configured to route traffic received at the closed port to the processing unit, the traffic originating from a sender, the processing unit configured to:
receive the traffic routed from the controller;
obtain, from the traffic, traffic data including routing information for the traffic, source information about the sender, and payload information of the traffic;
responsive to receiving the traffic routed from the controller and based on the traffic data obtained from the traffic, determine that the traffic is a threat;
determine that the traffic meets a threshold number of communication attempts by the sender at the closed port; and
responsive to determining that the traffic meets the threshold number of communication attempts at the closed port, perform protective measures comprising:
modifying an operation profile of the firewall;
over a secure session or secure tunnel, notifying at least one associated entity of the threat and providing the at least one entity with some or all of the traffic data obtained from the traffic, the at least one associated entity comprising a neighboring server or a clearinghouse;
using the traffic data obtained from the traffic to provide a response to the sender that has an inflated error rate associated with the closed port, the response providing an indication to the sender that a vulnerability exists and delaying the sender's discovery that the closed port is inactive, to provide the response comprising:
generating the response using the traffic data obtained from the traffic;
delaying communication of the response to the sender; and
reducing a packet size of the response to reduce communication bandwidth between the sender and the firewall.

5. The firewall of claim 4, wherein the processing unit is further operable to categorize the traffic on the closed port as having a predetermined attack profile.

6. The firewall of claim 4, wherein the response comprises data unrelated to any corresponding service of the one or more services that is associated with an active port of the plurality of ports.

7. The firewall of claim 4, wherein the response comprises information provided by the clearinghouse.

8. The firewall of claim 4, wherein determining that the traffic is a threat is further based on at least a portion of suspected attack information.

9. The firewall of claim 8, further comprising determining a trustworthiness ranking of the suspected attack information based on whether the suspected attack information is internally generated by the computer system, provided by the neighboring server, or provided by the clearinghouse.

10. A method comprising:
supporting a plurality of ports including a closed port that is inactive and not associated with a respective service;
routing, by a controller associated with a computer system, traffic that is received at the closed port to a processing unit associated with the computer system and separate from the controller, the traffic originating from a sender;
receiving the traffic routed from the controller;
obtaining, from the traffic, traffic data including routing information for the traffic, source information about the sender, and payload information of the traffic;
responsive to receiving the traffic routed from the controller and based on the traffic data obtained from the traffic, determining that the traffic is a threat;
determining that the traffic meets a threshold number of communication attempts by the sender at the closed port;
responsive to determining that the traffic meets the threshold number of communication attempts, performing protective measures comprising:
modifying an operation profile of the firewall;
over a secure session or secure tunnel, notifying an associated entity of the threat and providing the associated entity with some or all of the traffic data obtained from the traffic;
using the traffic data obtained from the traffic to provide a response with an inflated error rate on the closed port that indicates to the sender that a vulnerability exists and that delays discovery by the sender that the closed port is inactive, to provide the response comprising:
generating the response using the traffic data obtained from the traffic;

delaying communication of the response to the sender;

reducing a packet size of the response to reduce communication bandwidth between the sender and the firewall.

11. The method of claim 10, wherein the determining that the traffic is a threat is further based on suspected attack information.

12. The method of claim 11, further comprising determining a trustworthiness ranking of the suspected attack information based on whether the suspected attack information is internally generated by the computer system or received from the associated entity or another entity.

* * * * *